United States Patent [19]

Satoh

[11] Patent Number: 5,267,025
[45] Date of Patent: Nov. 30, 1993

[54] IMAGE SENSING APPARATUS HAVING TWO IMAGE SENSING PORTIONS AND ONE SIGNAL PROCESSING PORTION AND ALLOWING IMPROVED WHITE BALANCE CONTROL

[75] Inventor: Yoshinori Satoh, Yaita, Japan

[73] Assignee: Sharp Kabushiki Kaisha, Osaka, Japan

[21] Appl. No.: 946,605

[22] Filed: Sep. 18, 1992

[30] Foreign Application Priority Data

Sep. 19, 1991 [JP] Japan ................................. 3-268757
Sep. 19, 1991 [JP] Japan ................................. 3-268758

[51] Int. Cl.$^5$ .............................................. H04N 9/64
[52] U.S. Cl. ........................................ 358/29; 358/41; 358/50
[58] Field of Search ................. 358/41, 50, 29 C, 181, 358/909, 209, 213.11, 29

[56] References Cited

U.S. PATENT DOCUMENTS

| | | | |
|---|---|---|---|
| 4,626,893 | 12/1986 | Yamanaka | 358/29 |
| 4,809,061 | 2/1989 | Suzuki | 358/50 |
| 5,132,802 | 7/1992 | Osthues | 358/209 |
| 5,157,499 | 10/1992 | Oguma | 358/213.11 |

FOREIGN PATENT DOCUMENTS

2143683 6/1990 Japan .

*Primary Examiner*—James J. Groody
*Assistant Examiner*—Sherrie Hsia

[57] ABSTRACT

An image sensing apparatus according to the invention includes two image sensing portions, a signal processing portion, a first analog switch for applying one of the outputs of the two image sensing portions to the signal processing portion, a digital/analog converter for converting the digital amounts of first and second white balance control signals for the image sensing portions into analog amounts, second analog switches for selecting one of the first and second white balance control signals from the digital/analog converter and applying the selected one to the signal processing portion, and a control portion 11 for controlling the digital/analog converter 12 and the first and second analog switches.

12 Claims, 7 Drawing Sheets

IMAGE SENSING PORTION A

FIG.6

IMAGE SENSING PORTION B

FIG.7 PRIOR ART

IMAGE SENSING APPARATUS HAVING TWO IMAGE SENSING PORTIONS AND ONE SIGNAL PROCESSING PORTION AND ALLOWING IMPROVED WHITE BALANCE CONTROL

BACKGROUND OF THE INVENTION

1. Field of the Invention

The present invention relates generally to image sensing apparatuses, and more specifically, to an auto white balance circuit for use in an image sensing apparatus such as a video camera.

2. Description of the Background Art

Figure 7:
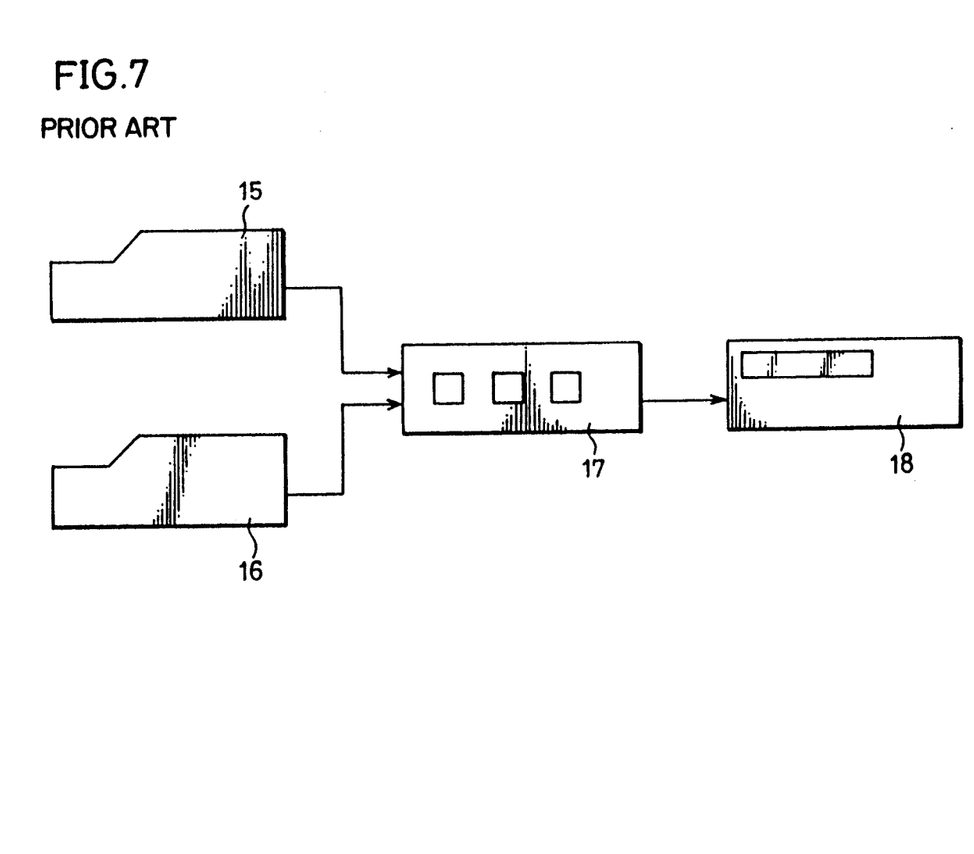
FIG. 7 is a diagram showing arrangement of two conventional video cameras disposed in parallel.

When one desires to obtain two image frames at a time using a conventional video camera, one possible method is to select the outputs of two independent video cameras 15, 16 as shown in FIG. 7 and to record them by a VTR 18.

According to such a method, however, though white balance is stable with the video cameras being independent, a large system will be necessary to accommodate the two video cameras, which is disadvantageous in terms of cost or portability. Constructing a video camera to have two image sensing portions, one signal processing portion, and a switch portion for switching between the image sensing portions as disclosed in Japanese Patent Laying-Open No. 2-143683 provides a less costly image sensing apparatus. However in this case, when the image sensing portions are switched from one to the other, or when an image obtained from one image sensing portion is entered into a part of an image obtained from the image sensing portion by switching the switch at a high speed a number of times, white balance is gradually disordered, resulting in difficulty in viewing of a reproduced image.

SUMMARY OF THE INVENTION

It is an object of the invention to improve the quality of a reproduced image in an image sensing apparatus having two image sensing portions and one signal processing portion.

Another object of the invention is to achieve appropriate white balance in an image sensing apparatus having two image sensing portions and one signal processing portion.

A further object of the invention is to conduct quick white balance control in an image sensing apparatus having two image sensing portions and one signal processing portion.

In order to achieve the above-stated objects, an image sensing apparatus in accordance with the invention includes a first image sensing portion for sensing the image of an object and outputting a first signal, a second image sensing portion for sensing the image of an object and outputting a second signal, a signal processing device for subjecting the input signal to a prescribed processing for output, a first switch for selecting one of the output first signal and second signal and applying the selected one to the signal processing device, a control signal generation device for generating a first control signal for the signal processing device to conduct a prescribed processing to the first signal and a second control signal for the signal processing device to conduct a prescribed processing to the second signal, a second switch for selecting one of the generated first control signal and second control signal and applying the selected one to the signal processing device, and a controller for controlling the first switch so that the switch selects one of the first signal and the second signal, and controlling the second switch so that the switch selects the first control signal or the second control signal corresponding to the selected first signal or second signal.

Thus constructed image sensing apparatus conducts a prescribed processing to a signal output from the switched image sensing portion based on a corresponding control signal, and the quality of a reproduced image is therefore improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
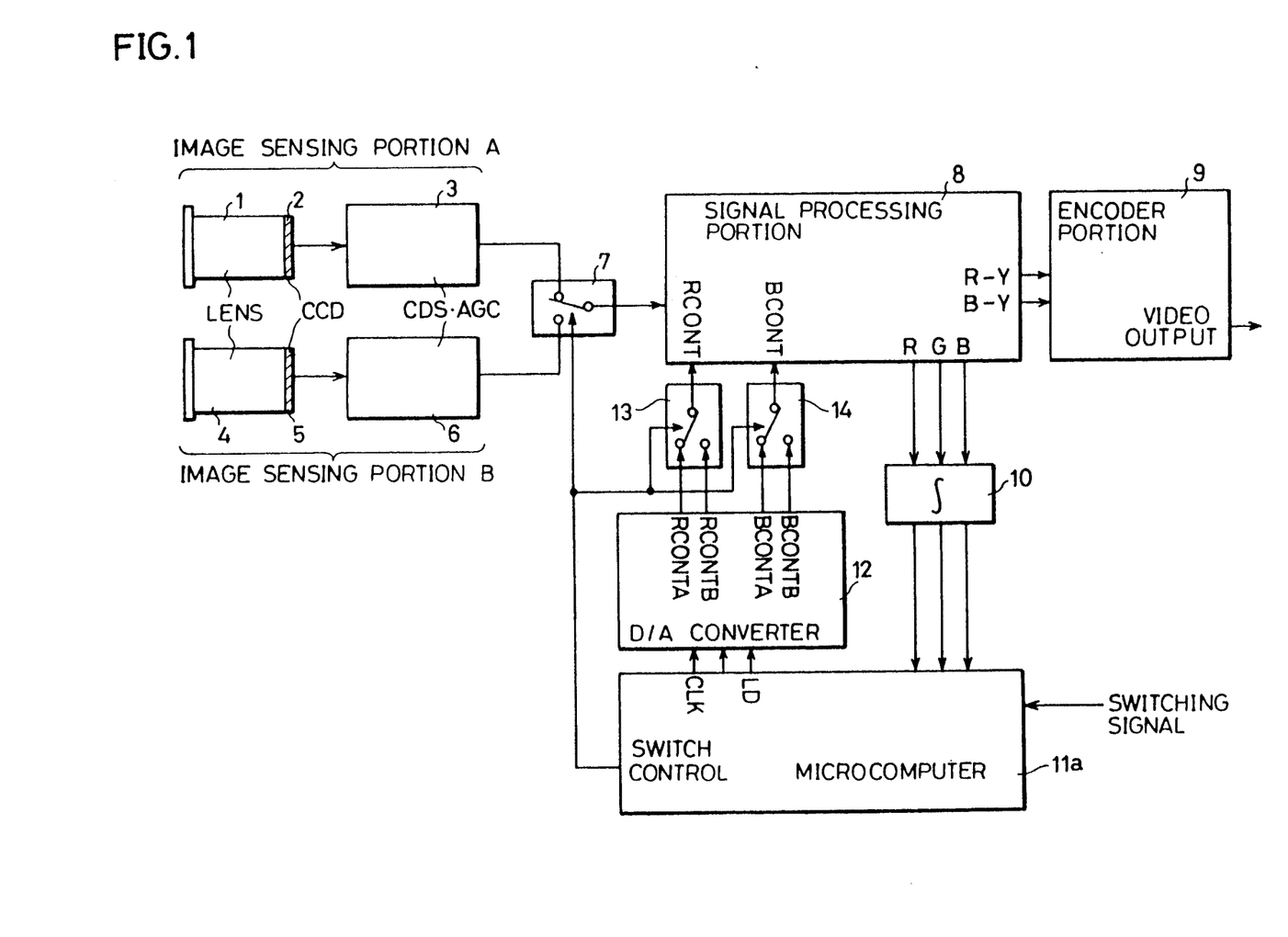
FIG. 1 is a system block diagram showing a construction of an image sensing apparatus in accordance with a first embodiment of the invention.

A first embodiment of the invention is illustrated as a block circuit in FIG. 1. In FIG. 1, one of an output signal from an image sensing portion A formed of an image sensing lens 1, a CCD (Charge Coupled Device) 2, and a CDS (Correlating Double Sampling)·AGC (Auto Gain Control) circuit 3, and an output signal from an image sensing portion B formed of an image sensing lens 4, a CCD 5, and a CDS·AGC circuit 6 is selected by an analog switch 7 and input into a signal processing portion 8.

In the signal processing portion 8, the signal selected from the image sensing portions A or B is divided into chrominance signal components RGB, from which color difference signals R-Y and B-Y are formed and input into an encoder 9. In the encoder 9, a luminance signal and a chrominance signal are produced and then mixed to form a video signal which is output to a succeeding stage circuit (not shown).

In an auto white balance circuit of signal processing type, the RGB signals formed in the signal processing portion 8 are converted into DC voltages in an integrated circuit 10, and input to a microcomputer 11a. The microcomputer 11a subjects each of the converted RGB signals to an A/D conversion, and supplies to a D/A converter 12 white balance control data of a signal level satisfying R=G=B. When the microcomputer 11a selects the image sensing portion A, controlling the switch 7 by its switch control, only a signal from the image sensing portion A is input to the signal processing portion 8. Therefore, only RGB signals from the image sensing portion A are input to the microcomputer 11a through the integrated circuit 10. Based on the RGB signals, the microcomputer 11a decides white balance control values Rcont·A and Bcont·A for the image sensing portion A, and transmits these control values to the D/A converter 12 using three lines, CLK, DATA, and LD. The D/A converter 12 conducts D/A conversion based on the incoming data and generates DC voltages. The DC voltages are supplied to the Rcont and Bcont terminals of the signal processing portion 8 through analog switches 13 and 14.

Meanwhile, a signal from the image sensing portion B is stopped by the function of the analog switch 7 and not input to the signal processing portion 8, but white balance control values Rcont·B and Bcont·B for the image sensing portion B are preferably estimated by a proportion calculation based on white balance control values Rcont·A and Bcont·A to the image sensing portion A.

The estimated Rcont·B and Bcont·B are, as is the case with the Rcont·A and Bcont·A, transmitted to the D/A converter 12 using three lines, CLK, DATA, and LD from the microcomputer 11a, and converted into DC voltages at the D/A converter 12 for input to the analog switches 13 and 14. At that time, with the analog switches 13 and 14 being set to pass Rcont·A and Bcont·A, Rcont·B and Bcont·B are not applied to the signal processing portion 8.

When the microcomputer 11a receives as a switching signal an instruction of switching between the image sensing portions A and B from an external portion (operation key), the microcomputer 11a does not have to make a control to the D/A converter 12, but simply switches the analog switches 7, 13 and 14 by inverting switch control. This is because Rcont·B and Bcont·B from the D/A converter are immediately applied to signal processing circuit 8 through the switches 13 and 14. Thereafter, the RGB signals from the image sensing portion B are input into the microcomputer 11a from the signal processing circuit 8 through the integrated circuit 10 with a delay of the time constant of the integrated circuit 10, and the white balance control values Rcont·B and Bcont·B for the image sensing portion B are determined based on the signals. Then, based on the determined control values Rcont·B and Bcont·B the microcomputer 11a estimates white balance control values Rcont·A and Bcont·A for the image sensing portion A.

A high speed control operation of the microcomputer 11a to the switches 7, 13, and 14 permits composing outputs from the image sensing portions A and B. For example, suppose that a part of a picture frame from the image sensing portion A is placed in a picture frame from the image sensing portion B. In this case, if the area of the image sensing portion A is wide enough as compared to the area of the image sensing portion B, RGB signals input to the microcomputer can be considered as signals from the image sensing portion A.

As described, the Rcont·A and Bcont·A are determined, the Rcont·B and Bcont·B are estimated, and the respective control values are transmitted to the D/A converter 12. The output of D/A converter 12 is selected by the analog switches 13 and 14 for input to the signal processing portion 8. A high speed switch control by the microcomputer 11a permits the control voltages Rcont·A and Bcont·A to be applied to the portion corresponding to the picture frame of the image sensing portion A, and control voltages Rcont·B nd Bcont·B to be applied to the portion corresponding to the picture frame of the image sensing portion B, thereby achieving stable white balance.

Figure 2:
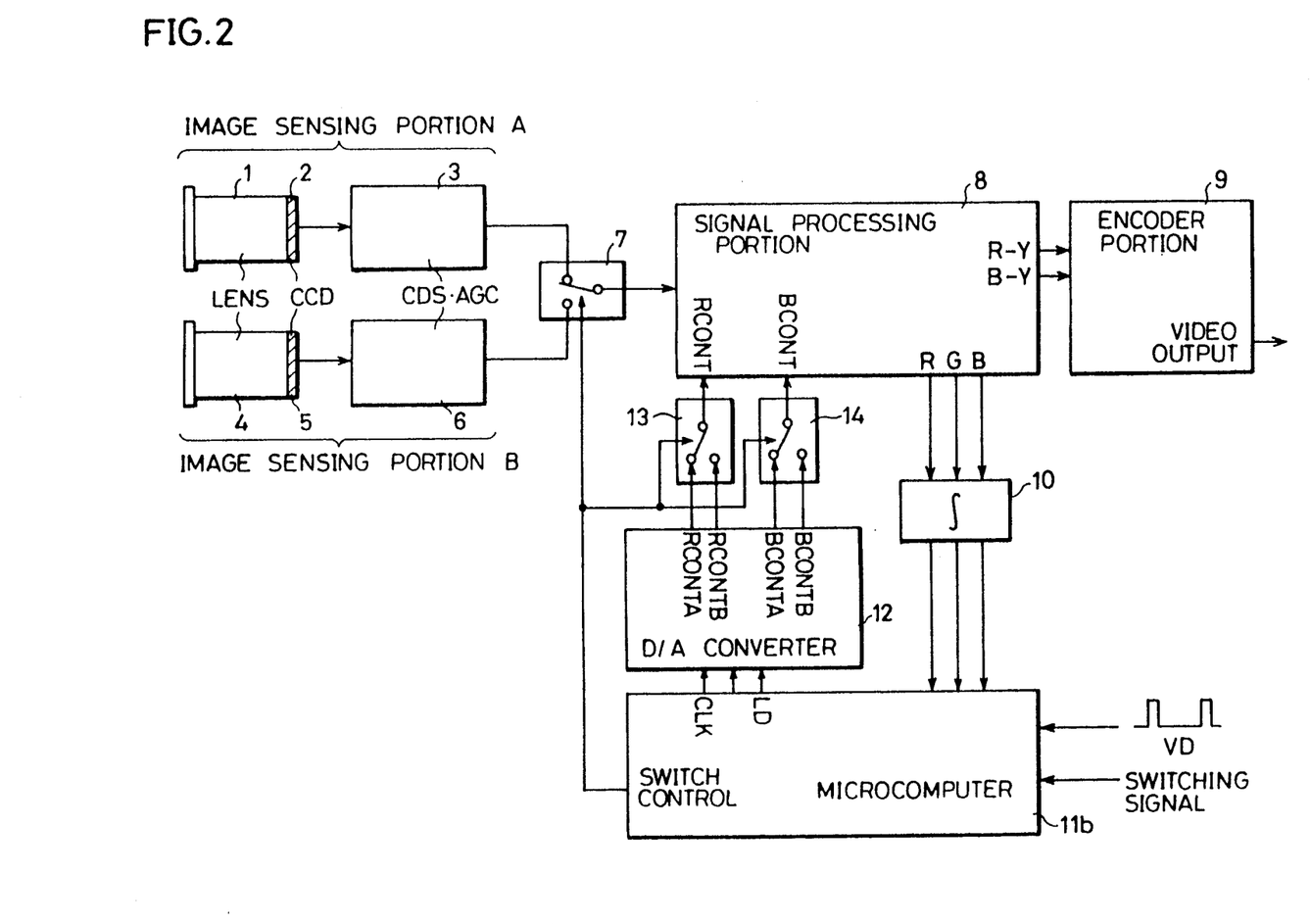
FIG. 2 is a system block diagram showing a construction of an image sensing apparatus in accordance with a second embodiment of the invention.

A description of a second embodiment of the invention follows in conjunction with FIG. 2. The same reference characters as FIG. 1 denote the same or corresponding portions in FIG. 2. In this embodiment, white balance operation is achieved by an interruption of a vertical pulse VD in synchronization with a vertical synchronizing signal. White balance is set to work only in response to a completion of a certain number of interruptions of the vertical pulse VD, not for every interruption of the vertical pulse VD. For this purpose, a VD counter is provided in a microcomputer 11b in a programming manner. However, for a fixed period immediately after switching of the image sensing portions, white balance operation is conducted even with a smaller number of interruptions of the vertical pulse VD as compared to an usual state. This means time until initiation of the white balance operation is reduced when switching between the image sensing portions.

Figure 3:
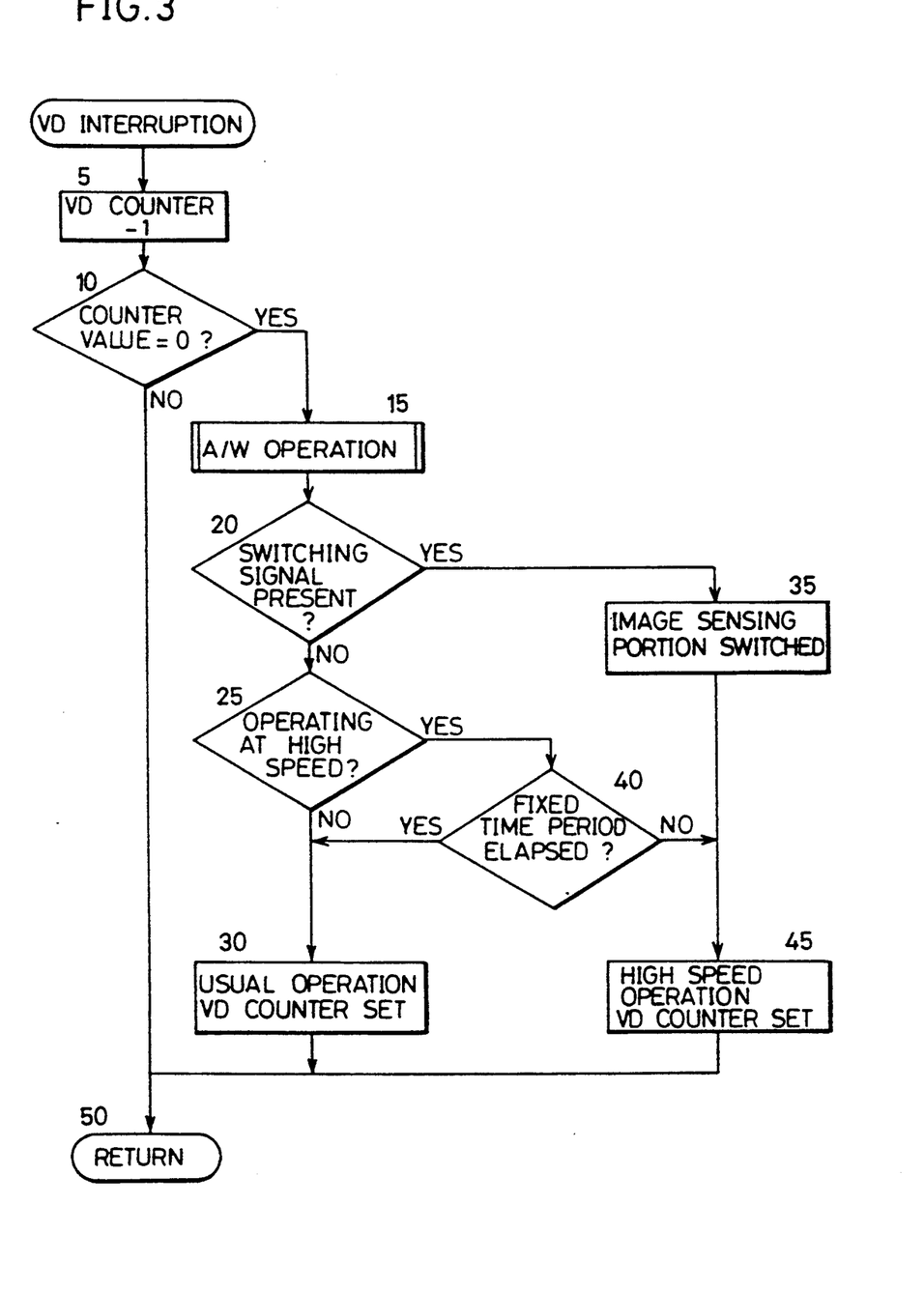
FIG. 3 is a flow chart for use in illustration of the content of control executed by the microcomputer shown in FIG. 2.

As illustrated by a flow chart in FIG. 3, when an interruption of the vertical pulse VD is made, the VD counter is decremented by 1 in step #5, and a determination whether or not the count value is 0 is made in step #10. If the count value is not 0, the interruption routine is completed (step #50), and if the count value is 0, the operation proceeds to step #15, and white balance operation as described above is conducted.

After the auto white balance operation is completed, a determination whether or not a switching signal is externally input from other microcomputers, switches, or the like to the microcomputer 11b is made in step #20. Then, if the switching signal is input, the microcomputer 11b proceeds to step #35, controls the analog switches 7, 13, 14 by its switch control, and switches between the outputs of the image sensing portions A, B and D/A converter 12. Then, in step #45, the value of the VD counter is set to a value for high speed operation, for example, 4VD, thus completing the interruption routine. Thus, the auto white balance operation is conducted at a high speed.

If in the above-stated step #20 there is not any switching signal, a determination whether or not white balance operation is presently going on at a high speed is made in the next step #25 and if the high speed operation is going on, a determination whether or not a fixed time period has elapsed is conducted (step #40), and if the fixed time has not yet elapsed, the high speed operation is continued (step #45). If the white balance operation is not going on at a high speed, or it is going on at a high speed but the fixed time period has already run out, the value of the VD counter is set to a value for usual operation 12VD, for example, in step #30, thus completing the interruption routine. Thus, after the elapsed time of 12VD counting value, the auto white balance operation will be resumed.

In the above-described operation, after a switching signal from an external portion (for example a key) is input and the image sensing portions are switched from one to the other, time until initiation of the auto white balance operation is reduced by the fixed time period.

Figure 4:
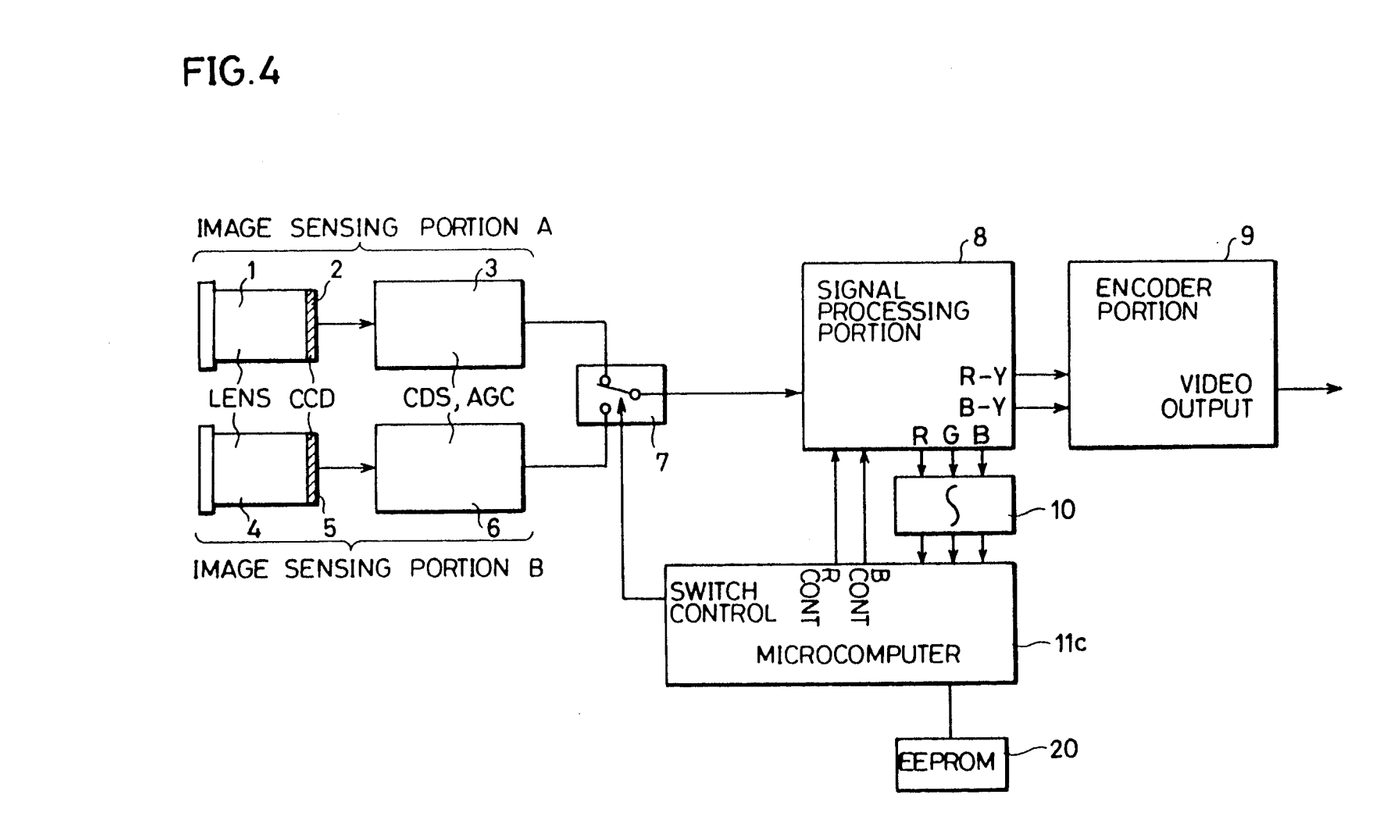
FIG. 4 is a system block diagram showing a construction of an image sensing apparatus in accordance with a third embodiment of the invention.

A description of a third embodiment of the invention follows in conjunction with a block diagram shown in FIG. 4. In FIG. 4, one of an output signal from an image sensing portion A formed of an image sensing lens 1, a CCD 2, and a CDS-AGC circuit 3, and an output signal from an image sensing portion B formed of an image sensing lens 4, a CCD 5, and a CDS-AGC circuit 6 is selected by an analog switch 7 and input to a signal processing portion 8.

At the signal processing portion 8, the signal from the image sensing portion is divided into chrominance signal components RGB, from which color difference signals R-Y and B-Y are formed to be input to an encoder 9. At the encoder 9, a luminance signal and a chrominance signal are produced and mixed to form a video signal to be output to a circuit of a succeeding stage (not shown).

In an auto white balance circuit of a signal processing type, the RGB signals formed in the signal processing portion 8 are converted into DC voltages at an integrated circuit 10, and input into a microcomputer 11c. The microcomputer 11c subjects them to an A/D conversion, and increases control signals Rcont, Bcont (Rcont and Bcont are DC voltages) to satisfy R=G=B. This operation is called white balance operation.

Figure 5:
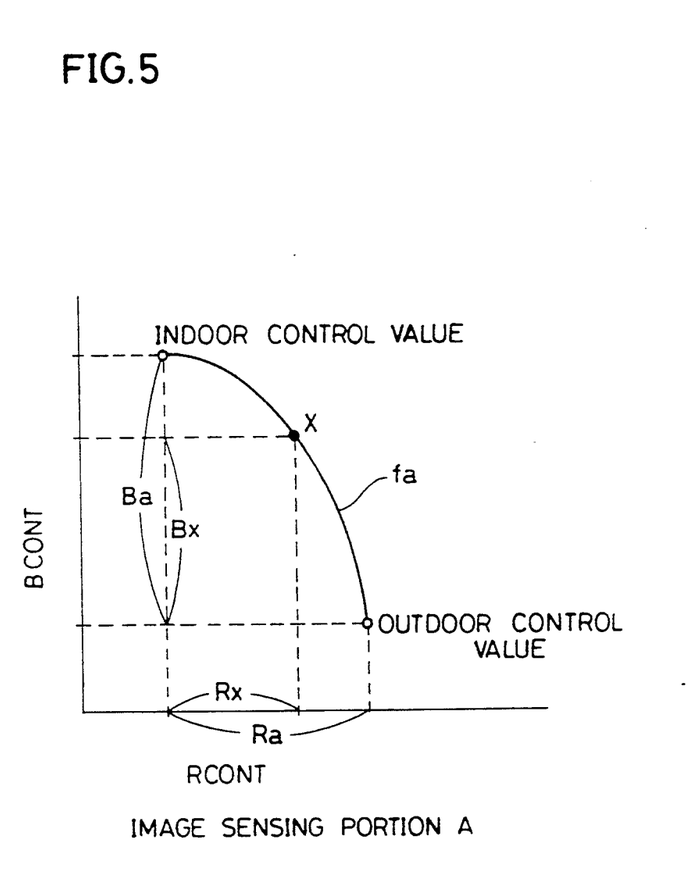
FIG. 5 is a representation showing a control function for an image sensing portion A for use in white balance control executed by the microcomputer shown in FIG. 4.
Figure 6:
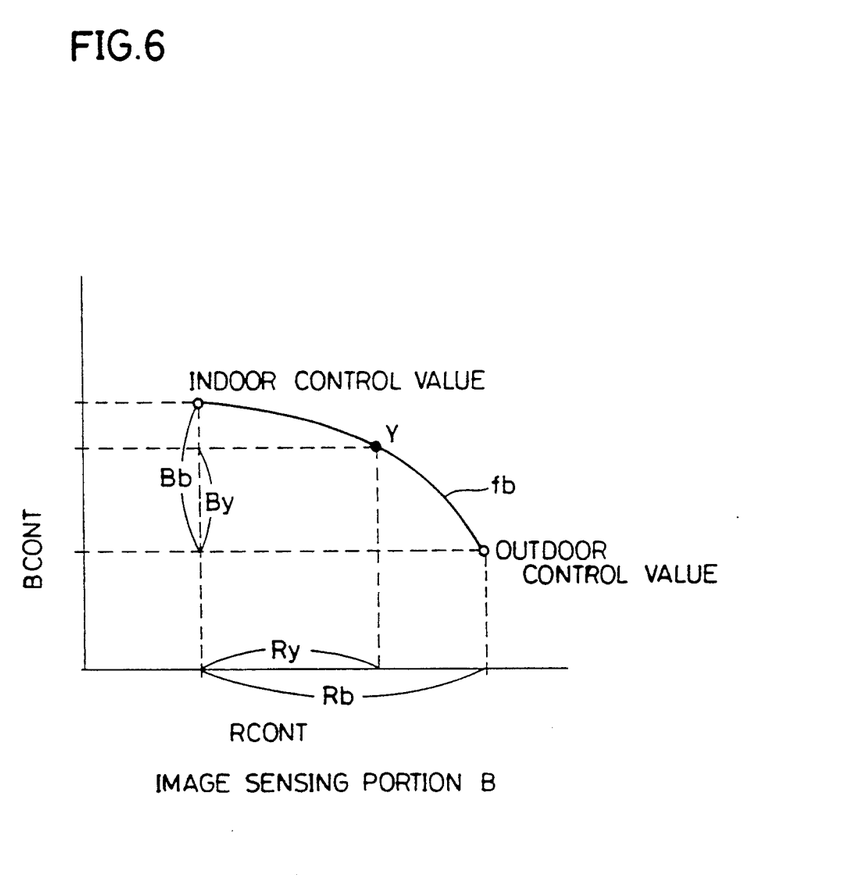
FIG. 6 is a representation showing a control function for an image sensing portion B for use in white balance control executed by the microcomputer shown in FIG. 4.

Generally, a control function is decided from control values Rcont and Bcont indoors which are stored in the microcomputer or an external EEPROM 20 at the time of manufacture and control values Rcont and Bcont outdoors (in some cases, in addition to these values, control values Rcont and Bcont under two or three kinds of fluorescent light), and based on the function, the Rcont and Bcont are controlled (see fa in FIG. 5 and fb in FIG. 6).

Now, assume that the microcomputer 11c sets the analog switch 7 to select the output of the image sensing portion A by the function of the switch control output signal. At that time, only the signal of the image sensing portion A is input to the signal processing portion 8, and the white balance of the image sensing portion A is made by an auto white balance operation. Now, suppose that the control value of the image sensing portion A in an auto white balance operation resides at point X in FIG. 5. At that time, the following calculation is conducted for estimating the control value of the image sensing portion B to some extent.

In FIG. 5, assume that the difference between the control value Rcont outdoors and the control value Rcont indoors is Ra, the difference between the control value Rcont at point X representing the control value at present and the control value Rcont indoors is Rx, while in FIG. 6, the difference between the control value Rcont outdoors of the image sensing portion B and the control value Rcont indoors is Rb, and the difference between the control value Rcont at point Y to be estimated and the control value Rcont indoors is Ry. Assuming that a proportional relation is established between these values, let $R=(Rx \times Rb)/Ra$ hold. Similarly, let the control value Bcont at point Y be represented as $By=(Bx \times Bb)/Ba$. Thus, if point X representing the control values of one image sensing portion changes, point Y representing the control values of the other image sensing portion is estimated following the change.

When a switching is made from the image sensing portion A to the image sensing portion B, the microcomputer 11c switches its switch control for the analog switch 7, and switches the control values from the Rcont and Bcont to the control values at point Y which has been estimated from the control values of point X. Similarly, when a switching is made from the image sensing portion B to the image sensing portion A, point X is estimated from point Y and the control values are switched accordingly.

When the image sensing portions are switched by the above-stated operation, the control values which have been previously estimated are output, and a substantially white balance match state is achieved.

As in the foregoing, according to the invention, the moment the image sensing portions are switched from one to the other, white balance is substantially established, and stable white balance is provided when two picture frames are mixed into one.

According to the invention, when objects under different conditions are image-sensed by the two image sensing portions, white balance shift created by a switching operation can quickly be corrected, and white balance follows a switching between picture frames with an improved accuracy.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image sensing apparatus, comprising:
 a first image sensing portion for sensing the image of an object to output a first signal;
 a second image sensing portion for sensing the image of an object to output a second signal;
 signal processing means for subjecting an input signal to a prescribed processing to output a signal;
 first switching means for selecting one of said output first signal and second signal and applying the selected signal to said signal processing means;
 control signal generation means for generating a first control signal for said signal processing means to conduct said prescribed processing to said first signal, and a second control signal for said signal processing means to conduct said prescribed processing to said second signal;
 second switching means for selecting one of said generated first control signal and second control signal and applying the selected signal to said signal processing means; and
 control means responsive to a switching signal for controlling said first switching means to select one of said first signal and second signal, and controlling said second switching means to select one of said first control signal and second control signal corresponding to said selected one of the first signal and second signal.

2. An image sensing apparatus recited in claim 1, wherein
 said prescribed processing includes white balance control to a chrominance signal of the input signal.

3. An image sensing apparatus as recited in claim 2, wherein
 said control signal generation means generates a white balance control value based on the chrominance signal of one of said first and second signals input to said signal processing means and to be subjected to said prescribed processing.

4. An image sensing apparatus as recited in claim 3, wherein said control signal generation means conducts a prescribed operation based on said generated white balance control value to generate the white balance control value of the other signal of said first and second signals.

5. An image sensing apparatus, comprising:
two image sensing portions each for sensing the image of an object to output a signal;
one system of signal processing portion for subjecting an applied signal to a prescribed processing;
a first analog switch for applying one of the outputs of said image sensing portions to said signal processing portion;
a digital/analog converter for converting digital amounts of first and second white balance control signals for said image sensing portions, respectively to analog amounts for output;
a second analog switch for selecting one of said first and second white balance control signals output from said digital/analog converter and applying the selected signal to said signal processing portion; and
control portion for controlling said digital/analog converter, and first and second analog switches.

6. An image sensing apparatus as recited in claim 5, wherein
said control portion is formed of a microcomputer, and said microcomputer forms a white balance control signal based on a chrominance signal from said signal processing portion and applies the white balance control signal to said digital/analog converter 7. An image sensing apparatus having an auto white balance function formed of a signal processing portion for processing signals applied from image sensing portions, and a control portion for applying a white balance control signal based on a chrominance signal applied from said signal processing portion to a control signal processing portion, comprising:
two image sensing portions each for sensing the image of an object to output a signal;
a first switch for applying one of the outputs of said image sensing portions to said signal processing portion;
a second switch for selecting said white balance control signal respectively for said image sensing portions output from said control portion and applying the selected signal to said signal processing portion; and
control means for controlling switching of said first and second switches.

8. A white balance circuit for a video camera having two image sensing portions and one signal processing portion and capable of image-sensing by switching between said image sensing portions, comprising:
auto white balance control means for forming a white balance control signal based on a chrominance signal from said signal processing portion and conducting white balance control of the chrominance signal in said signal processing portion by said white balance control signal at prescribed intervals;
execution means for executing said white balance control at intervals shorter than said prescribed intervals in a time period for processing when said image sensing portions are switched between each other.

9. A white balance circuit as recited in claim 8, wherein
said prescribed interval is decided by a prescribed number of interruptions of a vertical pulse (VD) in synchronization with a vertical synchronizing signal.

10. A white balance circuit as recited in claim 9, wherein
when said image sensing portions are switched between each other, white balance control is executed by a smaller number of interruptions of the vertical pulse (VD) than said prescribed number.

11. An image sensing apparatus having an auto white balance function formed of a signal processing portion for processing signals applied from image sensing portions and a control portion for applying a white balance control signal formed based on a chrominance signal applied from said signal processing portion to said signal processing portion, comprising:
two image sensing portions each for sensing the image of an object to output a signal;
a switch portion for applying one of the outputs of said image sensing portions to said signal processing portion;
storage means for previously storing a white balance adjustment data of said image sensing portions;
estimation means for estimating a white balance control signal for an image sensing portion which is not selected at the moment based on said stored white balance adjustment data and the white balance control signal for an image sensing portion selected at present; and
control means for setting said estimated white balance control signal as a white balance control signal for a switched image sensing portion, when the outputs of said image sensing portions are switched by said switch portion.

12. An image sensing apparatus as recited in claim 11, wherein
said white balance adjustment data includes a white balance control value indoors and a white balance control value outdoors.

* * * * *